United States Patent [19]

Kaufman

[11] Patent Number: 4,676,205
[45] Date of Patent: Jun. 30, 1987

[54] CRANKCASE AND CRANKSHAFT IMPACT PROTECTOR

[75] Inventor: Vernon R. Kaufman, Cedarburg, Wis.

[73] Assignee: Tecumseh Products Company, Tecumseh, Mich.

[21] Appl. No.: 280,889

[22] Filed: Jul. 6, 1981

[51] Int. Cl.⁴ .................................... A01D 35/262
[52] U.S. Cl. .................... 123/195 R; 56/17.5; 56/255; 56/295
[58] Field of Search ........ 123/195 R, 195 A, 179 SE, 123/185 A, 185 B, 185 BA, 185 R, 391; 56/17.5, 255, 295

[56] References Cited

U.S. PATENT DOCUMENTS

| | | | |
|---|---|---|---|
| 2,551,817 | 5/1981 | Taylor | 56/255 |
| 2,940,241 | 6/1960 | Stahl | 56/255 |
| 3,026,665 | 3/1962 | Hoff | 56/17.5 |
| 3,049,853 | 8/1962 | Horner et al. | 56/17.5 |
| 3,065,589 | 11/1962 | Summerour | 56/17.5 |
| 3,416,295 | 12/1968 | Kaufman | 56/17.5 |
| 3,420,042 | 1/1969 | Kaufman | 56/25.4 |
| 3,568,421 | 3/1971 | Smith et al. | 56/255 |
| 3,601,958 | 8/1971 | Roof | 56/13.7 |
| 3,890,773 | 6/1975 | Frost | 56/255 |
| 3,894,383 | 7/1975 | Weis et al. | 56/17.5 |
| 4,084,397 | 4/1978 | McGrath | 56/255 |
| 4,235,068 | 11/1980 | Comer | 56/295 |

FOREIGN PATENT DOCUMENTS 1131945  6/1962  Fed. Rep. of Germany ... 123/195 R

Primary Examiner—Craig R. Feinberg
Attorney, Agent, or Firm—Jeffers, Irish & Hoffman

[57] ABSTRACT

An arrangement for mounting a two-stroke cycle vertical crankshaft internal combustion engine on a rotary mower deck to accept a four-stroke cycle vertical crankshaft internal combustion engine whereby either type engine may be adapted to the same mower deck is disclosed including a feature for minimizing the risk of crankshaft or crankcase damage in the event of impact of the rotating mower blade with a relatively immovable object. By employing the adapted which allows mounting of the two-stroke cycle engine on the mower deck to also reinforce the lower region of the engine crankcase where the crankshaft extends from the crankcase a lighter weight, cheaper construction of the two-stroke cycle engine is possible.

7 Claims, 4 Drawing Figures

CRANKCASE AND CRANKSHAFT IMPACT PROTECTOR

The present invention relates generally to rotary mower constructions and, more particularly, to an arrangement for mounting an engine on a mower deck and protecting that engine from damage which might otherwise result from the mower blade striking an object.

Rotary lawnmowers have met with widespread commercial success and are relatively maintenance free and long lived, however, a frequent cause of the premature demise of a rotary mower engine is striking a relatively immovable object, such as a sprinkler head, curb, tree root, buried rock, or the like with the cutting blade. Such cutting blade impact can result in a bent or broken crankshaft, distorted or cracked lower main bearings or bearing housings and damaged or displaced lower main bearing seals in the engine. This problem is present in all rotary lawnmower engines but is more significant in the case of two-stroke cycle engines where, because no oil sump is required, the engine crankcase is frequently made significantly smaller and lighter than a comparable horsepower four-stroke cycle engine.

In engines where the lower main bearing housing is one integral piece, the structure can be strengthened by providing ribs or wall sections as part of the main bearing housing structure, however, in engine designs where the crankcase is split on the crankshaft centerline with fasteners joining the two halves together, the common practice to withstand such impact is to make flanges of a larger and heavier design, increase the number and size of fasteners and providing a mechanical retainer for the lower bearing seal, all in excess of what is required for normal engine operation on applications where impact resistance is not a factor.

One way to reduce the likelihood of crankshaft or crankcase damage due to impact of the mower blade with an immovable object is illustrated in U.S. Pat. No. 3,420,042, wherein a certain controlled amount of horizontal movement of the engine relative to the mower deck is allowed and after such movement, a portion of the mower deck serves to reinforce the crankshaft, minimizing the likelihood of damage. Slip clutches between the blade and shaft also have been employed. Another technique suggested by me is to increase the potential impact area by providing a cylindrical member attached to the crankshaft which, upon impact and distortion within the elastic limit of the crankshaft engages a portion of the mower deck to be reinforced thereby without any permanent deformation of the crankshaft.

While it is common practice to employ an adapter to mount certain engines on mowers designed to accept different engine configurations, such adapters have served no purpose other than that mounting function.

Among the several objects of the present invention may be noted the utilization of an adapter for mounting an engine to a mower deck for a purpose in addition to the mounting function; the provision of a mounting plate which serves the dual function of mounting the engine and providing crankshaft and crankcase impact protection; the elimination of the need for larger and heavier flanges and increased size and number of fasteners as well as a seal retainer in a two-stroke cycle engine having a crankcase split on the crankshaft centerline and used in a rotary mowing environment; and the utilization of the inherent strength of an engine mounting plate to reinforce the engine crankcase so as to provide greater impact resistance. These, as well as other objects and advantageous features of the present invention will be in part apparent and in part pointed out hereinafter.

In general, an adapter for fastening a two-stroke cycle engine to a mower deck is provided and fitted snugly about the engine crankcase in the region where the crankshaft extends therefrom to reinforce the crankcase in that region and thereafter the adapter is fastened to the engine and to the mower deck.

Also in general and in one form of the invention, the shaft and the crankcase of a two-stroke cycle internal combustion engine are protected from damage in the event that the mower blade strikes a relatively immovable object by forming a lower peripheral portion of the crankcase in the region where the crankshaft extends therefrom as a generally cylindrical shape and tightly encircling the peripheral portion of the crankcase with a mating annular member thereby reinforcing the lower region of the crankcase.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

Figure 1:
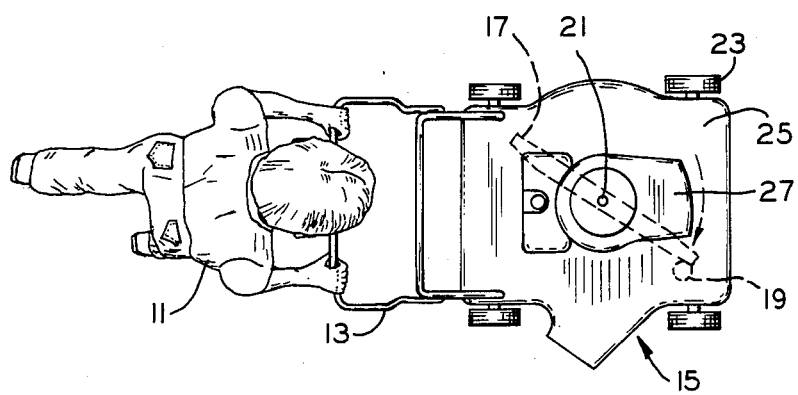
FIG. 1 is a plan view illustrating a rotary mower blade impacting an immovable object.

In FIG. 1 an operator 11 is guiding by handle 13 a rotary mower 15 the blade 17 of which has just impacted a relatively immovable object 19. When the end of blade 17 hits an object such as 19 the center of rotation of the blade 17 shifts from the engine crankshaft centerline 21 to the point of impact. Thus, the inertia of the rotating system tends to pivot the entire mower structure about the point of contact between blade 17 and the object 19 with a resulting torque reaction on the crankshaft which is transmitted through that crankshaft, lower main bearing, bearing housing, engine mounting, and mower housing to the wheels such as 23 and handle 13 all of which resist the sideways movement induced. The heavier the mower, the greater the resistance to movement and, therefore, the greater the forces that must be absorbed by the engine.

Figure 2:
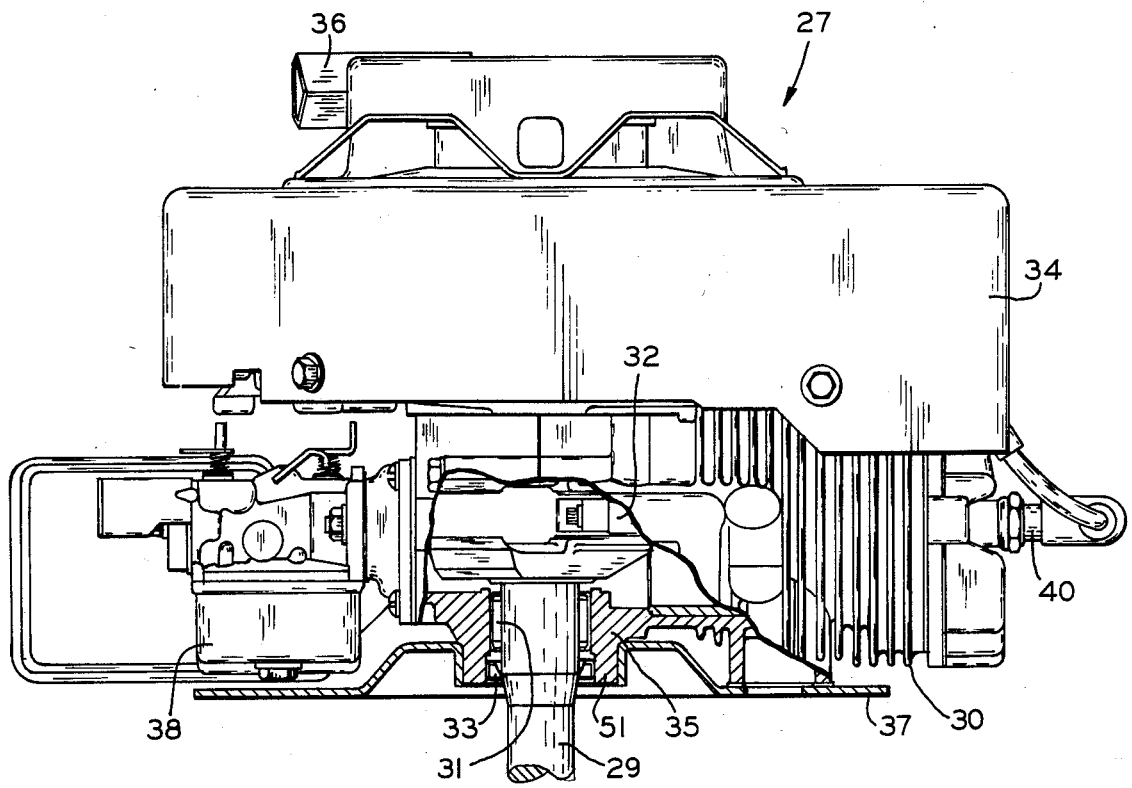
FIG. 2 is a side elevation view of a two-stroke cycle internal combustion engine and annular mounting plate.
Figure 3:
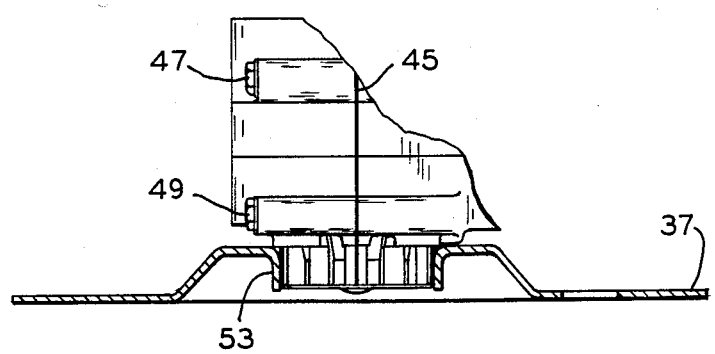
FIG. 3 illustrates the mounting plate and a lower portion of the engine of FIG. 2.

The general arrangment of the rotary mower 15 conventionally includes a deck 25 supported on wheels such as 23 and, in turn, supporting an engine 27 having a crankshaft 29 extending vertically along axis 21 with the blade 17 fastened to the lower end of the crankshaft 29 to be driven by the engine. In FIG. 2 engine 27 has a piston reciprocable horizontally in cylinder 30 and coupled by connecting rod 32 to the crankshaft 29 the upper end of which rotatably supports a flywheel in housing 34 and is conventionally coupled to a recoil starter arrangement 36. Engine 27 has a conventional fuel air intake system, including carburetor 38 and a conventional ignition system including the spark plug 40. As best seen in FIG. 2, the crankshaft 29 is supported by bearings 31 and extends through a lower seal 33 from the lower portion of crankcase 35 downwardly so that the blade rotates beneath deck 25. Crankshaft 29 of course extends through a hole in the mower deck 25 and the engine 27 is mounted on that deck by a mounting plate 37. The hole in deck 25 may be sufficiently large to mount a four-stroke cycle engine on deck 25 with its relatively large oil sump and crankcase having mounting bolt openings formed therein. Engine 27 is, however, illustrated as a sumpless, vertical crankshaft engine such as a two-stroke cycle internal combustion engine having a relatively small crankcase and apertures for receiving the relatively closely spaced mounting bolts such as 39 and 41 of FIG. 4. Thus, the adapter 37 is provided with mounting holes as at 43 to accommodate the corresponding holes in deck 25.

As illustrated, engine 27 has a crankcase 35 formed in two halves split generally along a plane 45 containing the centerline 21 with those halves being joined by bolts 47 and 49 which extend generally perpendicular to the plane 45 of the split. Such a split crankcase arrangement is a particularly economical form of construction. Crankcase 35 includes a generally cylindrical portion 51 which extends downwardly below the lowermost joining bolt 49 and which confines seal 33. It is this cylindrical portion 51 which is engaged and strengthened by a rim 53 of the mounting plate 37. Rim 53 tightly engages the lower portion 51 surrounding crankshaft 29 about the entire peripheral extent of that portion 51 to strengthen that portion and protect the crankshaft 29 and related engine parts from damage. Achieving an interference fit between the neck portion and rim 53 may be achieved by closely controlling the dimensional tolerances on these parts or may, in some cases, be achieved by providing a slight taper on the neck portion 51 if desired.

Figure 4:
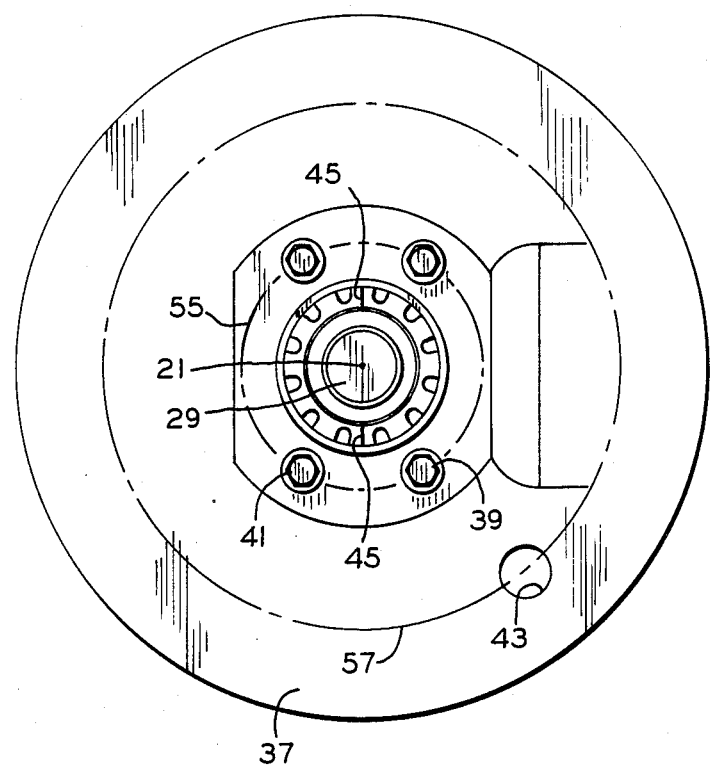
FIG. 4 is a bottom view of the adapter of FIGS. 2 and 3.

The structure of the annular flange itself is best seen in FIG. 4 where that flange 37 includes an inner plurality of mounting holes for receiving the bolts such as 39 and 41 for attaching flange 37 to the engine 27 with those holes being disposed generally about a circle 55. The holes such as 43 which align with matching holes in the mower deck 25 for fastening of the flange 37 to the deck 25 may be disposed about a concentric circle 57 with the diameter of circle 57 being about twice that of circle 55 in a typical installation. Both circles may of course be concentric with the inner circular rim 53. In some cases, the adapting flange 37 may be welded to mower deck 25 rather than attached thereto by bolts.

From the foregoing, it is now apparent that a novel crankcase strengthening arrangement employing an adapter snugly fitting about a lower neck region of the crankcase for preventing engine damage in the event that an immovable object is inadvertently struck has been disclosed meeting the objects and advantageous features set out hereinbefore as well as others and that modifications as to the precise configurations shapes and details may be made by those having ordinary skill in the art without departing from the spirit of the invention or the scope thereof as set out by the claims which follow.

What is claimed is:

1. In a rotary mower having a wheel supported deck, a sumpless vertical crankshaft engine and a mower blade fastened to the crankshaft to be driven by the engine, an improved annular mounting plate for attaching the engine to the deck with the engine crankshaft extending through the deck and the blade rotatable beneath the deck, the mounting plate having an inner rim for tightly engaging a lower portion of the engine surrounding the crankshaft about the entire peripheral extent of that portion to strengthen the engaged portion and protect the crankshaft and related engine parts from damage in the event that the blade strikes a relatively immovable object during mower operation, wherein the engine is a two-stroke cycle internal combustion engine having a crankcase formed in two halves split generally along a plane containing the centerline of the crankshaft and joined by bolts extending generally perpendicular to the plane of the split, the crankcase including a generally cylindrical portion extending downwardly beyond the lowermost or the joining bolts and confining at least a lower seal, the cylindrical portion comprising the portion engaged by the mounting plate inner rim.

2. In a rotary mower having a wheel supported deck, a sumpless vertical crankshaft engine having a crankcase with a generally cylindrical portion extending downwardly and sourrounding said crankshaft, a lower seal being confined by said cylindrical portion, and a mower blade fastened to the crankshaft to be driven by the engine, an improved annular mounting plate for attaching the engine to the deck with tne engine crankshaft extending through the deck and the blade rotatable beneath the deck, the mounting plate having an inner rim tightly engaging said downwardly extending cylindrical portion of the engine about the entire peripheral extent of that portion to strengthen the engaged portion and protect the crankshaft and related engine parts from damage in the event that the blade strikes a relatively immovable object during mower operation.

3. The improvement of claim 2 wherein the engine includes a plurality of closely spaced mounting bolt receiving holes and the deck includes a plurality of relatively more widely spaced mounting bolt receiving holes, the mounting plate being provided with holes aligned with each said plurality of holes and receiving bolts fastening the engine to the mounting plate as well as bolts fastening the mounting plate to the deck.

4. An annular flange for coupling to a mower deck a vertical crankshaft engine of the two-stroke cycle type having a crankcase formed in two halves split generally along a plane containing the center line of the crankshaft and with the crankcase including a generally cylindrical portion extending downwardly and confining at least a lower seal, said flange having a plurality of mounting holes disposed generally about a circle for accepting bolts for attaching the flange to the engine and an inner circular rim concentric with the mounting hole circle for tightly engaging the generally cylindrical portion of the engine along the entire peripheral extent of that portion to thereby simultaneously strengthen the engaged portion and provide support for the engine on the mower deck.

5. The flange of claim 4 including an outer peripheral portion radially outside the mounting hole circle for fastening the flange to the mower deck.

6. The flange of claim 5 wherein the outer peripheral portion includes a further plurality of mounting holes disposed generally about a larger circle concentric with the inner circular rim.

7. The flange of claim 6 wherein the diameter of the circle of one plurality of holes is about double the diameter of the circle of the other plurality of holes.

* * * * *

UNITED STATES PATENT AND TRADEMARK OFFICE
CERTIFICATE OF CORRECTION

PATENT NO.   : 4,676,205

DATED        : June 30, 1987

INVENTOR(S)  : Vernon Ray Kaufman

It is certified that error appears in the above-identified patent and that said Letters Patent is hereby corrected as shown below:

Claim 1, Col. 4, line 15, change "or" to --of--;

Claim 2, Col. 4, line 21, change "sourrounding" to --surrounding--;

Claim 2, Col. 4, line 25, change "tne" to --the--.

Signed and Sealed this

Tenth Day of November, 1987

Attest:

DONALD J. QUIGG

Attesting Officer

Commissioner of Patents and Trademarks